June 6, 1961 J. T. BEVANS 2,986,890
COLD JUNCTION FOR THERMOCOUPLE
Filed Jan. 14, 1960
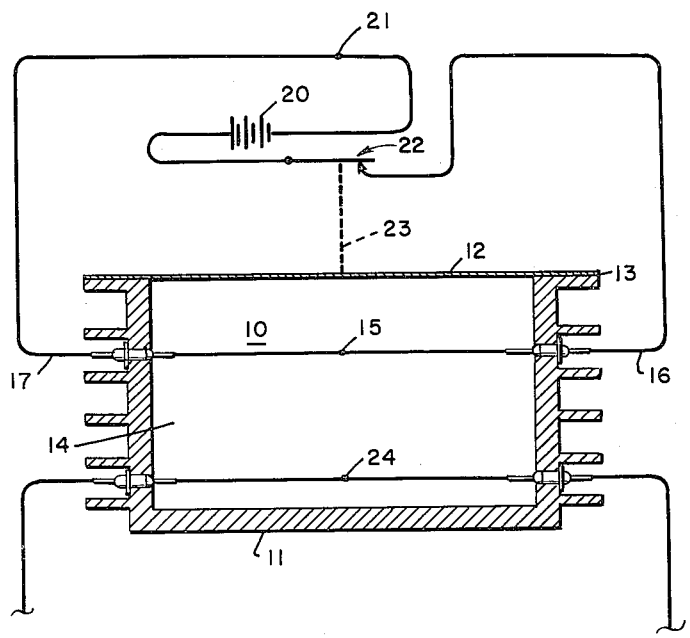
INVENTOR
J.T. BEVANS
BY Theodore E. Bieber
HIS ATTORNEY

2,986,890
COLD JUNCTION FOR THERMOCOUPLE
Jerry T. Bevans, Berkeley, Calif., assignor to Shell Oil
Company, a corporation of Delaware
Filed Jan. 14, 1960, Ser. No. 2,472
3 Claims. (Cl. 62—3)

This invention pertains to thermocouples and more particularly to a reference temperature source for the cold junction of a thermocouple.

It is well known that thermocouples will only give accurate results if the cold junction thereof is maintained at a constant temperature. It has been proposed in the past that the cold junction be heated by a thermostatically controlled means in order to provide a constant temperature environment for the cold junction. While this provides a constant temperature environment for the cold junction, it limits the range of temperatures which may be measured by the thermocouple due to the high temperature of the cold junction. This system also requires the use of thermostatic type controls for maintaining a constant temperature. The temperature range of operation of the thermostatic control determines the temperature variation of the cold junction. Thus, the cold junction is not maintained at a constant temperature but rather within a certain temperature range.

In cases where it is not desirable to incorporate means for maintaining the cold junction of the thermocouple at a constant temperature it has been the practice in the past to use a compensating resistor in the temperature recorder to compensate for variations in the temperature of the cold junction. While this is also a possible solution it requires that the value of the resistors be changed whenever different thermocouple materials are used or when the instrument is relocated in a different temperature environment.

Accordingly, the principal object of this invention is to provide a novel reference temperature location for the cold junction of a thermocouple.

A further object of this invention is to provide a novel reference temperature utilizing only static devices and capable of maintaining the temperature within a narrow range.

The above objects of this invention are achieved by utilizing the Peltier effect to cool a material which will go through a change of state and a change in volume at the desired temperature of the cold junction. The change of state and change of volume of the material are utilized to control the flow of current through the Peltier junction to maintain the material at a constant temperature. The cold junction of the thermocouple is disposed in the material in order that it may be maintained at the temperature of the material.

The above objects and advantages of this invention will be more easily understood from the following detailed description when taken in conjunction with the attached drawing in which there is shown a schematic arrangement of a preferred embodiment of this invention.

Referring now to the drawing, there is shown a sealed housing 10 which is formed from a cup-shaped lower member 11 and a top cover 12. The top cover 12 should be formed of a relatively thin resilient material in order that it may operate as a flexible diaphragm to allow the material which fills the housing to either expand or contract as it undergoes a change in state. Likewise, the cup-shaped member 11 should be formed with relatively heavy walls so that it has sufficient rigidity to resist movement due to a change in state of the material 14. The top cover 12 is hermetically sealed to the bottom member 11 along the outer edges 13 by any desired means such as welding or the like. The housing 10 is filled with a material 14 which is capable of undergoing a change in its physical state at the desired temperature of the cold junction. Various gas mixtures may be used which will change from a liquid to a gas at various temperatures or liquids which freeze may be used. A suitable material is water which will change to a solid at approximately 0° C. thus maintaining the cold junction at approximately 0° C. A further requirement of the material filling the housing 10 is that when it undergoes its change of state it must also undergo a change in its physical volume either by expanding or contracting.

Disposed within the housing 10 is a Peltier junction 15. The junction 15 is coupled to the other junction 21 of the Peltier circuit by means of leads 16 and 17. Suitable seals are disposed in the walls of the bottom member 11 where the leads 16 and 17 pass through the walls. Disposed in the lead 16 is a source of direct potential 20 and a switch 22. The switch 22 is preferably a microswitch which may be operated directly by the movement of the top cover 12. The connection between the top cover and the switch is shown schematically by the dotted line 23. While a micro-switch is used, other arrangements could also be used such as the deflection of a light beam by the top cover or the changing of the capacitance of a system such as an oscillator circuit by deflection of the top cover. Also, disposed within the housing 10 is the cold junction 24 of a thermocouple whose hot junction is not shown in the attached drawing since it may be located remotely from the reference temperature.

When the above instrument is operated the micro-switch 22 will close sending current through the cold junction 15 and hot junction 21 of the Peltier circuit providing of course the material 14 is in the proper physical state. This will lower the temperature of the material 14 filling the housing 10 until it undergoes a change in state. In case the material 14 is water, when it reaches 0° C. it of course will freeze and expand. The expansion will cause the top cover 12 to be deflected, which deflection will be used to operate the micro-switch 22 or other device to interrupt the current flow through the junctions 15 and 21. The heat transfer through the bottom member 11 and diaphragm 12 will then cause the material to revert to its former state which in the case of water would be the liquid state. If required, radiating fins may be provided on the outer surface of the bottom member to increase the efficiency of the heat transfer. When a sufficient quantity of the material has reverted to the former state due to the absorption of heat the top cover will be deflected in the opposite direction an amount sufficient to close the micro-switch 22. This will again establish a current flow through the junctions 15 and 21 to cool the material 14. This process will be repeated with the temperature of the material 14 being maintained substantially at the temperature at which it undergoes a change in state. Thus, the thermocouple junction 24 will be maintained at a substantially constant temperature by the reference temperature source.

While but one preferred embodiment of this invention is described, it is subject to many modifications and changes within its broad inventive concept.

I claim as my invention:

1. A reference temperature source for the cold junction of a thermocouple comprising: a sealed housing, at least a portion of the housing being formed from a resilient material; said housing being filled with a material having a change of state temperature substantially coinciding with the desired cold junction temperature of the thermocouple; a first junction of two different materials being disposed within the housing and a second junction of said two different materials being disposed outside the housing; a circuit means including a source of potential coupling said first and second junctions together; a switch means disposed in said circuit means and responsive to the deflection of the resilient portion of the housing wall caused by a change in the state of the fill material for interrupting the current flow from said potential source through said first and second junctions and means for transferring heat from the surrounding atmosphere to said fill material when said current flow is interrupted.

2. A reference temperature source comprising: a sealed housing, at least a portion of the housing being formed from a resilient material; said housing being filled with water; a first junction of two different materials being disposed within the housing and a second junction of said two different materials being disposed outside the housing; a circuit means including a source of potential coupling said first and second junctions together; a switch means disposed in said circuit means and responsive to the deflection of the resilient portion of the housing wall caused by a change in the state of the water for interrupting the current flow from said potential source through said first and second junctions.

3. A reference temperature source for the cold junction of a thermocouple comprising: a cup-shaped member having its open end closed by a flexible diaphragm to form a sealed housing, said sealed housing being filled with water; a Peltier junction between two materials being disposed within said sealed housing and the other junction between said two materials being disposed outside said sealed housing; a circuit means including a source of potential coupling the two junctions together; a switch means disposed in said circuit means and responsive to movement of said diaphragm caused by a change in the state of said water to control the flow of current from said potential source through said junctions and means including radiating fins formed on said member for transferring heat from the surrounding atmosphere to said water when said current flow is interrupted.

References Cited in the file of this patent

UNITED STATES PATENTS

| | | |
|---|---|---|
| 2,524,886 | Colander | Oct. 10, 1950 |
| 2,777,975 | Aigrain | Jan. 15, 1957 |